(12) United States Patent
Wellhoefer et al.

(10) Patent No.: US 9,189,894 B2
(45) Date of Patent: Nov. 17, 2015

(54) FLEXIBLE COMBINATION SENSOR MODULE FOR A VEHICLE

(75) Inventors: Matthias Marcus Wellhoefer, Stuttgart (DE); Mariusz Koc, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 51 days.

(21) Appl. No.: 14/000,063

(22) PCT Filed: Dec. 22, 2011

(86) PCT No.: PCT/EP2011/073807
§ 371 (c)(1),
(2), (4) Date: Nov. 26, 2013

(87) PCT Pub. No.: WO2012/110150
PCT Pub. Date: Aug. 23, 2012

(65) Prior Publication Data
US 2014/0081477 A1 Mar. 20, 2014

(30) Foreign Application Priority Data
Feb. 17, 2011 (DE) .................. 10 2011 004 333

(51) Int. Cl.
| | |
|---|---|
| *G06F 7/00* | (2006.01) |
| *G07C 5/00* | (2006.01) |
| *B60T 8/171* | (2006.01) |
| *B60T 8/1755* | (2006.01) |
| *G01P 15/18* | (2013.01) |

(52) U.S. Cl.
CPC . *G07C 5/00* (2013.01); *B60T 8/171* (2013.01); *B60T 8/1755* (2013.01); *B60T 2270/413* (2013.01); *G01P 15/18* (2013.01)

(58) Field of Classification Search
None
See application file for complete search history.

(56) References Cited

U.S. PATENT DOCUMENTS

| | | | |
|---|---|---|---|
| 4,914,598 A | 4/1990 | Krogmann et al. | |
| 5,201,380 A * | 4/1993 | Callahan | ........................ 180/403 |
| 5,274,894 A * | 1/1994 | Wilhelm et al. | ................. 28/202 |
| 5,297,052 A | 3/1994 | McIntyre et al. | |
| 6,023,664 A | 2/2000 | Bennet | |
| 2012/0317773 A1* | 12/2012 | Hale | .......................... 29/407.09 |

FOREIGN PATENT DOCUMENTS

| | | |
|---|---|---|
| CN | 101151176 A | 3/2008 |
| CN | 101156045 A | 4/2008 |
| EP | 1 795 902 | 9/2005 |
| JP | 2002-515977 | 5/2002 |
| JP | 2006-90919 | 4/2006 |
| JP | 2008-21732 | 1/2008 |
| JP | 2009-168777 | 7/2009 |
| JP | 2009-204459 | 9/2009 |
| JP | 2010-190701 | 9/2010 |

OTHER PUBLICATIONS

International Search Report, PCT International Application No. PCT/EP2011/073807, dated Apr. 20, 2012.

* cited by examiner

*Primary Examiner* — Adam Alharbi
(74) *Attorney, Agent, or Firm* — Kenyon & Kenyon LLP

(57) ABSTRACT

A combination sensor module for a vehicle, having at least two sensor submodules which are situated in the combination sensor module and able to be connected to the electronics system of the vehicle, wherein the at least two sensor submodules are able to be operated independently of each other.

21 Claims, 2 Drawing Sheets

FLEXIBLE COMBINATION SENSOR MODULE FOR A VEHICLE

FIELD

The present invention relates to sensor systems for a vehicle. Specifically, the present invention relates to a combination sensor module for a vehicle, to a vehicle, especially an automobile, having a combination sensor module, and to the use of a combination sensor in a vehicle.

BACKGROUND INFORMATION

Modern vehicles commonly include a multitude of driver-assistance systems and expanded safety devices such as belt tighteners or airbags. To ensure proper functioning of these assistance or safety systems, precise knowledge of the current movement situation of the vehicle is required in most cases.

For example, acceleration sensors may detect the acceleration or deceleration of a vehicle in a certain direction, while rate-of-rotation sensors may detect twisting or a rotation of the vehicle about an axis.

Normally, a three-dimensional coordinate system X,Y,Z is used for this purpose, X denoting the longitudinal axis, Y the transverse axis, and Z the vertical axis of the vehicle. Roll-rate sensors, on the other hand, are able to detect a rotation of the vehicle about the X,Y,Z axes.

Conventional micromechanical combination modules may include a plurality of sensors, in particular three sensors, which have associated degrees of freedom, are frequently disposed. These may not necessarily be three acceleration sensors exclusively, or three roll-rate sensors or rotation sensors, but a combination of acceleration and rotation sensor is possible as well.

Different driver assistance system or safety systems may feature very individualized sensor combinations in this context.

For an ESP module, for example, a sensor having three degrees of freedom, i.e., generally a 3D sensor element, may be provided, which is able to detect an acceleration in the X and Y directions, as well as a rotation about the Z-axis. For a rollover sensor, on the other hand, a 3D sensor may measure an acceleration in the Y and Z-axes, and furthermore a rotation about the X-axis.

Such sensor modules, however, are mostly designed or optimized for a particular use. A simple exchange is therefore often impossible.

SUMMARY

One aspect of the present invention may thus be the provision of a flexible sensor module.

In light of this aspect, a combination sensor module for a vehicle, a vehicle, especially an automobile, having a combination sensor module in accordance with the present invention, and the use of a combination sensor module in a vehicle are provided.

The rising demand for new functions in a vehicle goes hand-in-hand with the need for additional sensor channels. However, in safety-relevant components such as an airbag control device, for example, or other integration platforms such as driver-assistance systems, more and more micromechanical sensors are installed.

Such a sensor system may be developed up to a maximum of 6D sensing. 6D in this context may be a sensor element having six degrees of freedom, e.g., acceleration and deceleration for the X, Y and Z axes, and furthermore the rotation about the X, Y and Z axes. In general, an "X"D sensing setup may thus be considered a sensing setup having "X" degrees of freedom or "X" independent sensor channels.

For example, for active learning functions, even a "6D+ redundant" ESP sensor system is possible.

On the one hand, the present invention may realize the combination of at least one 5D sensor system, that is to say, an acceleration of the X, Y and Z axes, and a rotation about the X and Z axes, but advantageously it may realize a 6D sensor system, which is to say, an acceleration and rotation about each X, Y, Z axis in a shared sensor module.

The sensor module according to the present invention may be optimized in such a way that it continues to be usable as module for specific functions even if a defect or selective damage has occurred. For example, if one sensor degree of freedom exhibits a defect or selective damage, a 6D sensor module according to the present invention is still usable as at least a 5D sensor module.

Within the scope of the present invention, the combination of a 6D sensor system in a shared sensor combination module is therefore indicated, but especially, the function-allocated placement, control, diagnosis and testability of the individual components.

As a result, it is possible to produce only one module which, given the full functional scope, is able to be used as a 6D sensor module.

In case of a restricted functionality, i.e., when selective defects arise in a single submodule or a single sensor path, for example, the sensor combination module, or the combination sensor module according to the present invention may be used as a sensor module having a reduced sensing system or requiring such a reduced sensing system for a particular use.

For example, in the case of a selective defect of one sensor path, a combination sensor module initially developed as 6D sensor module may also be used as an ESP sensor module, as a rollover sensor module or as a pitch rate sensor module, depending on which one of said sensor paths is defective or exhibits the selective damage.

This advantageously results in a reduced number of module variants, and additionally, in lower development costs, as well as higher yield through the reuse of rejected parts in that the corresponding partially defective sensor module is able to be used as a sensor module offering a reduced functionality.

It is also possible to selectively derive a cost-effective variant from a 6D sensor module in that, for example, testing steps for a separate function are omitted, through contacting to the outside of electronics situated inside the module is dispensed with, or else a portion of the insides of the module, which may be completely self-contained and have a discrete design, is not fitted with components. A combination of ESP and rollover sensor systems may be particularly advantageous, especially for the US vehicle market.

As a result, new functions that require additional degrees of freedom or sensor paths are also able to be realized by a 6D sensor module, e.g., video-based systems, supplemented by the pitch rate of the vehicle.

In accordance with the present invention, the combination sensor module for a vehicle according to the present invention has at least two sensor submodules, which are disposed in a combination sensor module and able to be connected to the electronics of the vehicle, the at least two sensor submodules being operable independently of each other.

The example combination sensor module according to the present invention thus has at least two completely independent regions or blocks, i.e., sensor elements or application-specific integrated circuits (ASICs), which provide an autonomous function in each case. Each region or each sensor submodule, taken by itself, therefore can offer a 1D, 2D or 3D sensing capability, for instance. The sensor submodules are placed, completely separately from each other, in a shared module, i.e., the combination sensor module. It is especially preferred if the sensor submodules are even installed so as to be galvanically separated from each other.

When viewed together, the at least two sensor submodules developed as a 3D sensor module in each case, for instance, thus form a 6D sensor module for the combination sensor module.

A modular design of the combination sensor module may be especially advantageous in this context. For example, the individual sensor elements or semiconductor elements of each sensor submodule are able to be placed on top of each other using a so-called stacking method.

The individual sensor submodules function completely autonomously in this case and may even have a separate/autonomous voltage supply or energy supply, and also a separate diagnosis function, for example.

As a result, two independent sensor submodules are able to be disposed in the combination sensor module, which, however, act as a common 6D sensor module when viewed from the outside. Toward this end, a shared control of the regions or function blocks or sensors or sensor subelements may take place as well, e.g., via another module such as a common interface module, situated in the combination sensor module.

In this case the interface module may also provide a (separate) supply, signal transfer, interface and diagnosis of the sensor submodules, which, though realized separately, may be controllable centrally. The interface module is also able to specify whether a combination sensor module is used as, for example, a 6D sensor module, a 3D-ESP sensor module, or as a 3D rotation sensor module, or behaves like one outwardly.

For example, in a case where both sensor submodules function perfectly, the combination sensor module may be used as a 6D sensor module, whereas if one sensor submodule has a defect, the combination sensor module is at least still usable as a 3D-ESP or 3D rotation sensor module.

However, a defect or selective damage may also be present if a requested or specified measuring accuracy of a sensor module is unable to be provided.

In this case, a sensor submodule that provides the specified measuring accuracy may be used as automotive submodule which provides safety-relevant functions in the vehicle or monitors such functions, whereas a sensor submodule that is unable to supply the specified measuring accuracy may be used as part of a consumer electronics system in the vehicle, for example, for an image stabilization of cameras, linking of a mobile telephone to the automotive electronics, for audio and/or video reproduction.

Using the interface module, in particular, the combination sensor module may be connected to an Ethernet bus system or a vehicle bus system, such as a CAN bus or FlexRay.

Exemplary embodiments of the present invention are illustrated in the figures and explained in greater detail below.

DETAILED DESCRIPTION OF EXAMPLE EMBODIMENTS

Figure 1A:
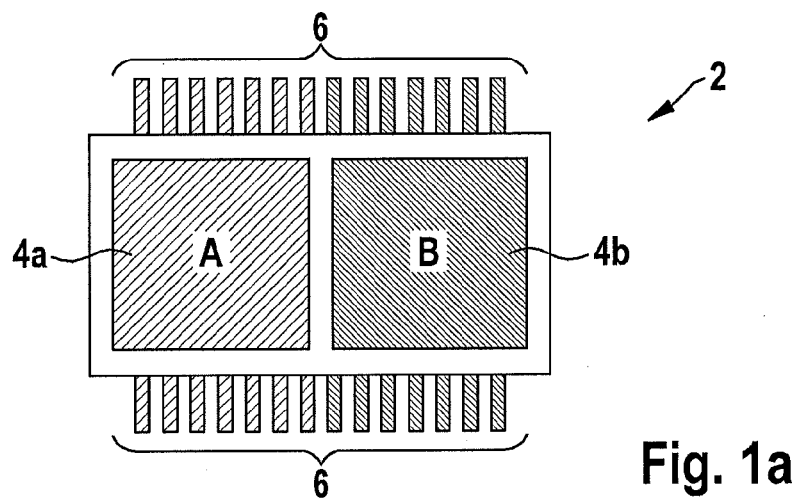
FIGS. 1a-c shows a schematic representation of an exemplary embodiment of a combination sensor module according to the present invention.
Figure 1B:
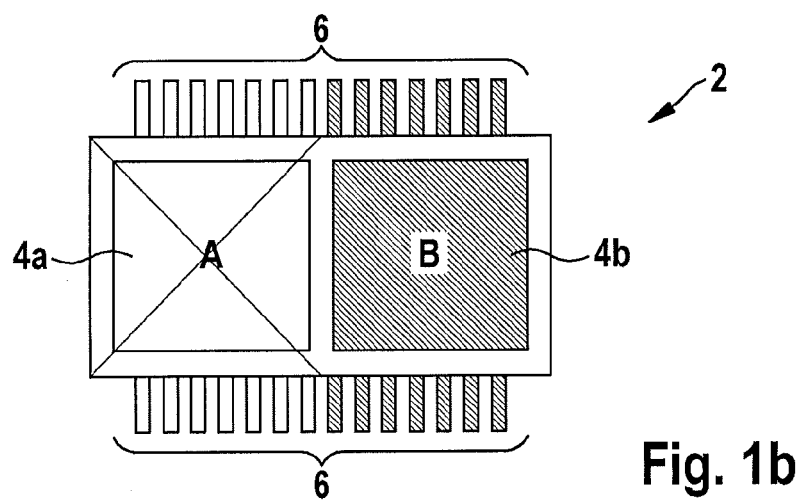
Figure 1C:
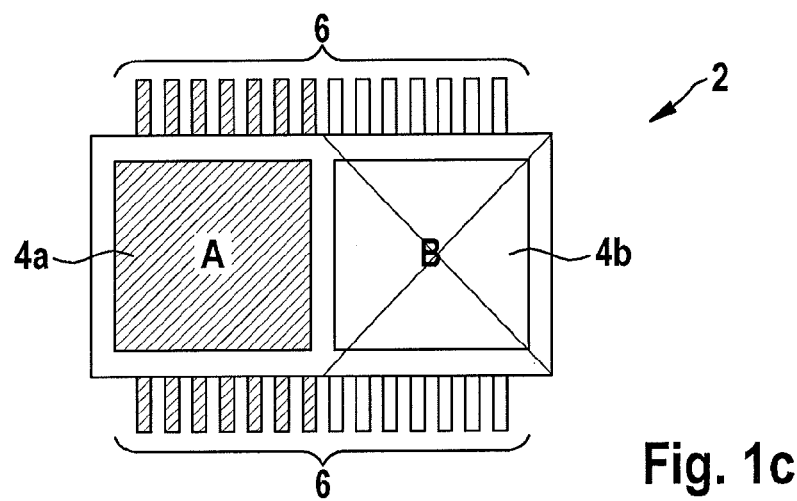

FIGS. 1a-c show a schematic representation of an exemplary embodiment of a combination sensor module according to the present invention.

FIG. 1a shows a combination sensor module 2 according to the present invention, which has two sensor submodules 4a, b, denoted by the letters A and B. The two sensor submodules 4a, b are accommodated in a shared housing of combination sensor module 2, but set up completely separately.

Each of the two regions, or each of sensor submodules 4a, b is set up to provide different functions, especially separately from the particular other sensor submodule 4b, a.

For example, sensor submodule 4a may be developed as an ESP sensor module, and sensor submodule 4b may be set up as a rollover sensor module. Each of these different module functions may require 3D sensing, for instance, which may add up to 6D sensing altogether. Areas A and B of sensor submodules 4a, b are routed out of the housing or out of combination sensor module 2 at different pins 6.

Combination sensor module 2 according to FIG. 1a is ready for operation in all areas A and B; it therefore represents at least a 5D or 6D module, viewed across both areas A and B.

FIG. 1B shows a combination sensor module 2 according to FIG. 1a; in this case, however, it is assumed that area A or sensor submodule 4a is not in a functioning state. Area A or sensor submodule 4a may either be faulty, e.g., due to a defect during the production, or also not have been tested according to the specification or not approved.

In terms of production technology, combination sensor module 2 according to FIG. 1b may be able to be derived from a full module 2 according to FIG. 1a, but usable only as "B-module" providing the functionality of the B area or of sensor submodule 4b. Pins 6 associated with area A or sensor submodule 4a may either not be assigned, not through-contacted or possibly also not be present at all or not be wired to the outside.

Combination sensor module 2 according to FIG. 1c is once again derived from combination sensor module 2 as full module according to FIG. 1a, but in this case, only area A or sensor submodule 4a is functioning. As a result, combination sensor module 2 according to FIG. 1c generally represents an "A module" providing an A functionality.

Figure 2A:
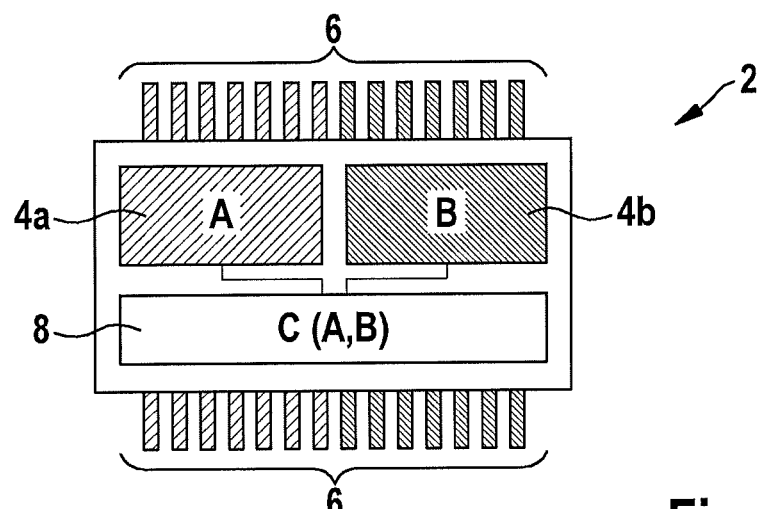
FIGS. 2a,b shows a schematic representation of another exemplary development of the present invention.

With further reference to FIGS. 2a, b, a schematic representation of another exemplary development of the present invention is illustrated.

FIG. 2a shows an expanded development of the present invention. Combination sensor module 2 once again has at least two autonomous functional areas A, B or at least two sensor submodules 4a, b.

Another interface module 8, or an area C, which provides common functions for sensor submodules 4a, b, is provided in combination sensor module 2. For example, interface module 8 may provide a shared energy supply, diagnosis, signal conditioning and/or interface function for sensor submodules 4a, b.

In this case, however, interface module 8 is developed in such a way that it able to provide the respective functionalities at one of sensor submodules 4a, b, without being adversely affected by the other sensor submodule. In other words, interface module 8 likewise provides the particular functionalities to sensor submodules 4a, b in independent manner.

For example, sensor submodules 4a, b may be linked to interface module 8 either in parallel or using a multiplex method. Pins 6 once again provide a contacting option for combination sensor module 2 toward the outside.

FIG. 2a shows combination sensor module 2 with the full functional scope, made up of two fully functional sensor submodules 4a, b.

Figure 2B:
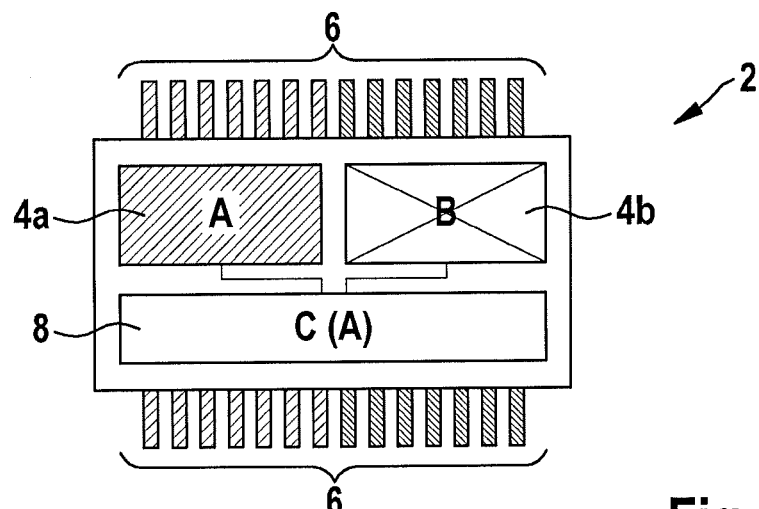

Combination sensor module 2 according to FIG. 2b generally corresponds to full module or combination sensor module 2 according to FIG. 2a; analogous to FIG. 1c, however, area B, or sensor submodule 4b, is deactivated, not approved, or not functional, so that entire combination sensor module 2 according to FIG. 2b essentially represents an "A module" and provides an A-functionality.

What is claimed is:

1. A combination sensor module for a vehicle, comprising:
   a housing having at least two completely independent regions; and
   at least two sensor submodules, each of the at least two sensor submodules:
      disposed in a different one of the at least two completely independent regions in the combination sensor module,
      able to be connected to an electronics system of the vehicle, and
      able to be operated one of: independently and in combination with an other one of the at least two sensor submodules.

2. The combination sensor module as recited in claim 1, wherein the at least two sensor modules are able to be operated independently so that one of the at least two sensor submodules is set up to continue operating in case of a defect or a malfunction of the other one of the at least two sensor submodules.

3. The combination sensor module as recited in claim 1, further comprising:
   an interface module, the at least two sensor submodules coupled to the interface module for communication purposes, and the interface module to provide at least one of the functions from the group consisting of: energy supply, diagnosis, signal conditioning and interface functionality for the at least two sensor submodules.

4. The combination sensor module as recited in claim 1, wherein at least one of: i) each of the at least two sensor submodules is developed as a 3D sensor module, and ii) the at least two sensor submodules are jointly developed as a 6D sensor submodule.

5. The combination sensor module as recited in claim 1, wherein each of the at least two sensor submodules is developed as a sensor module from the group consisting of:
   rollover sensor module, pitch rate sensor module, electronic stability program (ESP) sensor module, 3D rate-of-rotation module, and triaxial acceleration sensor.

6. The combination sensor module as recited in claim 1, wherein the at least two sensor submodules are developed to be galvanically separate of each other, and disposed in the combination sensor module.

7. The combination sensor module as recited in claim 1, wherein the combination sensor module is configured so that it is operable as a 6D sensor module when the at least two sensor submodules do not have any defect, and the combination sensor module is operable at least as a 3D sensor module if one of the at least two sensor submodules has a defect.

8. An automobile, including a combination sensor module, the combination sensor module including:
   a housing having at least two completely independent regions; and
   at least two sensor submodules, each of the at least two sensor submodules:
      disposed in a different one of the at least two completely independent regions in the combination sensor module,
      able to be connected to an electronics system of the vehicle, and
      able to be operated one of: independently and in combination with an other one of the at least two sensor submodules.

9. A method, comprising:
   providing a combination sensor module in a vehicle, the combination sensor including:
      a housing having at least two completely independent regions, and
      at least two sensor submodules, each of the at least two sensor submodules:
         disposed in a different one of the at least two completely independent regions the combination sensor module,
         able to be connected to an electronics system of the vehicle, and
         able to be operated one of: independently and in combination with an other one of the at least two sensor submodules; and
   using the combination sensor.

10. The method as recited in claim 9, wherein the using step includes operating the combination sensor module as 6D sensor module when the at least two sensor submodules do not have any defects, and operating the combination sensor module at least as a 3D sensor module when one of the at least two sensor submodules has a defect.

11. The combination sensor module as recited in claim 1, further comprising:
   a group of pins, for each of the at least two sensor submodules, providing output that is one of: data related to the independent operation of a respective sensor submodule and data related to a combined operation of at least two of the at least two sensor submodules.

12. The combination sensor module as recited in claim 1, wherein each of the at least two sensor submodules offers one of a 1D, 2D, or 3D sensing capability.

13. The combination sensor module as recited in claim 3, wherein the interface module is coupled via a connection that is one of parallel and multiplexed between a first one and a second one of the at least two sensor submodules.

14. The automobile as recited in claim 8, wherein each of the at least two sensor submodules is developed as a sensor module from the group consisting of:
   rollover sensor module, pitch rate sensor module, electronic stability program (ESP) sensor module, 3D rate-of-rotation module, and triaxial acceleration sensor.

15. The automobile as recited in claim 8, wherein each of the at least two sensor submodules have: (i) a separate energy supply and (ii) a separate diagnosis function.

16. The automobile as recited in claim 8, the combination sensor further comprising:
   an interface module, the at least two sensor submodules coupled to the interface module for communication purposes, and the interface module to provide at least one of the functions from the group consisting of: energy supply, diagnosis, signal conditioning and interface functionality for the at least two sensor submodules.

17. The method as recited in claim 9, wherein each of the at least two sensor submodules is developed as a sensor module from the group consisting of:
   rollover sensor module, pitch rate sensor module, electronic stability program (ESP) sensor module, 3D rate-of-rotation module, and triaxial acceleration sensor.

18. The method as recited in claim 9, wherein the using step includes:
   operating the combination sensor module as a 6D sensor module when the at least two sensor submodules do not have any defects; and
   deactivating a defective one of the at least two sensor submodules when one of the at least two sensor submodules is defective and operating the combination sensor module at least as a 3D sensor module.

19. The method as recited in claim 9, the combination sensor further comprising: an interface module, the at least two sensor submodules coupled to the interface module for communication purposes, and the interface module to provide at least one of the functions from the group consisting of: energy supply, diagnosis, signal conditioning and interface functionality for the at least two sensor submodules.

20. A combination sensor module for a vehicle, the combination sensor module comprising:
   at least two sensor submodules disposed in the combination sensor module, the at least two sensor submodules capable of being connected to an electronics system of the vehicle; and
   an interface module,
   wherein the at least two sensor submodules are coupled to the interface module for communication purposes, and wherein:
      responsive to the at least two sensor submodules not having any defects, the interface module specifying that the combination sensor module is used as a fully functional sensor module, and
      responsive to at least one of the at least two sensor submodules having a defect, the interface module specifying that the combination sensor module is used as a reduced functional sensor module.

21. A combination sensor module for a vehicle, the combination sensor module comprising:
   at least two sensor submodules disposed in the combination sensor module, the at least two sensor submodules capable of being connected to an electronics system of the vehicle,
   wherein:
      a sensor submodule from the at least two sensor submodules that provides a specified measuring accuracy is used in an automotive submodule that provides safety-relevant functions in the vehicle, and
      a sensor submodule from the at least two sensor submodules that does not provide the specified measuring accuracy is used in a consumer electronics system in the vehicle.

* * * * *